United States Patent
Tiwari et al.

(10) Patent No.: US 10,239,754 B1
(45) Date of Patent: Mar. 26, 2019

(54) PROCESS FOR STRIPPING HYDROPROCESSED EFFLUENT FOR IMPROVED HYDROGEN RECOVERY

(71) Applicant: UOP LLC, Des Plaines, IL (US)

(72) Inventors: Neeraj Tiwari, Haryana (IN); Richard K. Hoehn, Mount Prospect, IL (US); Kiran Ladkat, Haryana (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/802,665

(22) Filed: Nov. 3, 2017

(51) Int. Cl.
| | |
|---|---|
| *C10G 7/00* | (2006.01) |
| *C10G 45/00* | (2006.01) |
| *C10G 47/00* | (2006.01) |
| *C10G 49/00* | (2006.01) |
| *C10G 49/22* | (2006.01) |
| *C01B 3/50* | (2006.01) |
| *B01L 3/06* | (2006.01) |
| *B01L 3/14* | (2006.01) |

(52) U.S. Cl.
CPC .......... *C01B 3/50* (2013.01); *B01L 3/06* (2013.01); *B01L 3/14* (2013.01); *C10G 45/00* (2013.01); *C10G 2300/42* (2013.01)

(58) Field of Classification Search
CPC .......... C10G 7/00; C10G 45/00; C10G 47/00; C10G 49/00; C10G 49/22
USPC ... 208/347, 352, 356, 361, 107, 184, 254 H, 208/264
See application file for complete search history.

(56) References Cited

U.S. PATENT DOCUMENTS

| | | | |
|---|---|---|---|
| 3,100,006 A | 8/1963 | Sheets et al. | |
| 4,363,178 A | 12/1982 | Erickson | |
| 8,715,596 B2 | 5/2014 | Hoehn et al. | |
| 2010/0200459 A1 | 8/2010 | Bhattacharya | |
| 2015/0064076 A1* | 3/2015 | Sadler | C10G 65/08 422/187 |
| 2017/0050177 A1 | 2/2017 | Greeley et al. | |

FOREIGN PATENT DOCUMENTS

| | | |
|---|---|---|
| WO | 2006071505 A1 | 7/2006 |
| WO | 2017116731 A1 | 7/2017 |

OTHER PUBLICATIONS

Conover, Hydroprocessing ((Hydrocracking)) to Yield Middle Distillates, Natl. Pet. Refiners Assoc. Annu. Meet. (San Antonio Mar. 24-26, 1985) PAP. N.85-41 30P, Mar. 24, 1985.
Gas processes 2000: Hydrogen (Medal), Hydrocarbon Processing, v 79, n. 4, p. 72, Apr. 2000.
Irvine, Converting carbon residue to power and hydrogen needs, Hydrocarbon Technology International (ISSN 0952-1399) 47-50 (Winter 1994-95), Winter 1994-1995, p. 47-50, Dec. 1994.
Zhang, Revamping of recycled hydrogen compressor for Zhenhai hydrocracking unit, Petroleum Refinery Engineering, v 32, n. 2, p. 28-29, Feb. 25, 2002.

* cited by examiner

*Primary Examiner* — Thuan D Dang
(74) *Attorney, Agent, or Firm* — Paschall & Maas Law Office, LLC; James C. Paschall

(57) ABSTRACT

A process is disclosed for reducing loss of hydrogen in solution to the fractionation section of a hydroprocessing unit. The hot liquid stream is stripped with an inert gas in a hot flash stripper to urge hydrogen into the hot flash vapor stream. Substantial conservation of hydrogen gas is achieved.

14 Claims, 2 Drawing Sheets

PROCESS FOR STRIPPING HYDROPROCESSED EFFLUENT FOR IMPROVED HYDROGEN RECOVERY

FIELD

The field is hydroprocessing hydrocarbon streams.

BACKGROUND

Hydroprocessing can include processes which convert hydrocarbons in the presence of hydroprocessing catalyst and hydrogen to more valuable products.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst. Hydrocracking can be performed with one or two hydrocracking reactor stages. In single stage hydrocracking, only a single hydrocracking reactor stage is used. Unconverted oil may be recycled from the product fractionation column back to the hydrocracking reactor stage. In two-stage hydrocracking, unconverted oil is fed from the product fractionation column to the second hydrocracking reactor stage. Slurry hydrocracking is a slurried catalytic process used to crack residue feeds to gas oils and fuels.

Due to environmental concerns and newly enacted rules and regulations, saleable fuels must meet lower and lower limits on contaminates, such as sulfur and nitrogen. New regulations require essentially complete removal of sulfur from diesel. For example, the ultra-low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

In slurry hydrocracking, a three-phase mixture of heavy liquid oil feed cracks in the presence of gaseous hydrogen over solid catalyst to produce lighter products under pressure at elevated temperature. Many of the products from slurry hydrocracking may require further upgrading.

A hydroprocessing recovery section typically includes a series of separators in a separation section to separate gases from the liquid materials and cool and depressurize liquid streams to prepare them for fractionation into products. Hydrogen gas is recovered for recycle to the hydroprocessing unit. A stripper for stripping hydroprocessed effluent with a stripping medium such as steam is used to remove unwanted hydrogen sulfide from liquid streams before product fractionation.

In hydroprocessing recovery, liquid streams from a hot separator and a cold separator are let down in pressure prior to being routed to the fractionation section and the gases evolved are separated in the hot flash drum and a cold flash drum, respectively. The evolved gases are rich in hydrogen and these streams are often routed to hydrogen recovery facilities. In the absence of the flash drums the hydrogen solution loss contained in the liquid from the high pressure separators would otherwise be lost in the fractionation section off-gas. By keeping the pressure of the hot and cold flash drums high, recovered hydrogen streams can be sent directly to the makeup gas header without further need of compression. However, higher pressure forces more hydrogen into liquid solution, causing more loss of hydrogen in the fractionation off-gas which is typically sent to the fuel gas header.

Efficient use of hydrogen is critical to the economics of a hydroprocessing unit. A significant amount of hydrogen is lost in the hot flash liquid stream that is sent to the stripper column. This is called solution loss, and it represents a potential sizable loss of a valuable resource to the fractionation section where it ends up in the fuel gas. Methods have been disclosed to recover the hydrogen in the stripper off gas stream but requires compression to be able to route this stream to the cold flash drum off gas stream in which it can be routed to hydrogen recovery. Compression of the stripper off gas is expensive in both capital and operation.

There is a continuing need, therefore, for improved methods of recovering hydrogen gas from hydroprocessed effluents.

BRIEF SUMMARY

We have found that stripping the hot separator liquid in a hot flash stripper significantly decreases the solution loss of hydrogen in the hot flash liquid stream that is advanced to the product stripping column. In process and apparatus embodiments, the hot flash stripper concentrates hydrogen in the hot flash vapor stream from which hydrogen gas can be recovered.

DEFINITIONS

Figure 1:
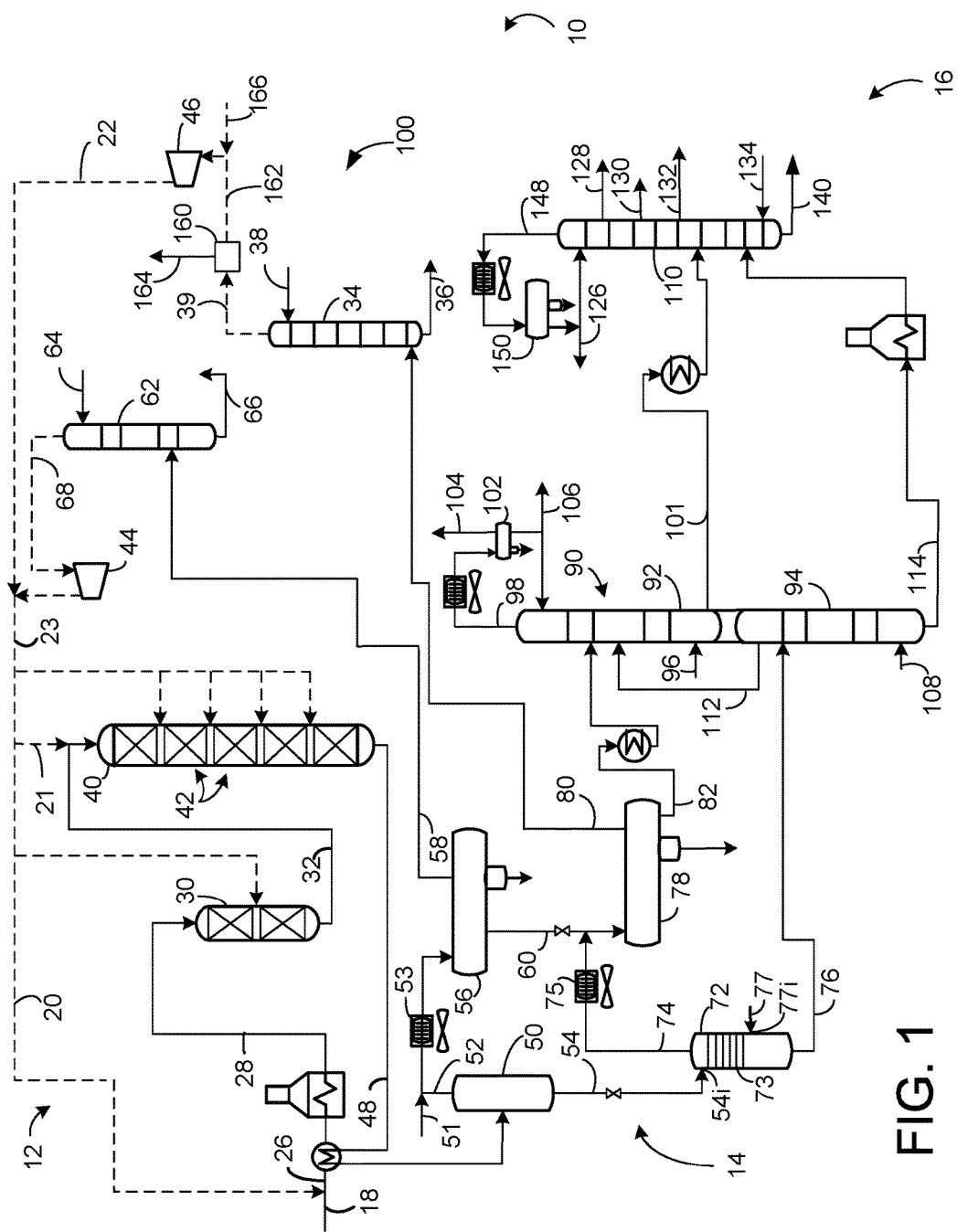
FIG. 1 is a simplified process flow diagram.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "conversion" means conversion of feed to material that boils at or below the diesel boiling range. The diesel cut point of the diesel boiling range is between about 343° and about 399° C. (650° to 750° F.) using the True Boiling Point distillation method.

As used herein, the term "diesel boiling range" means hydrocarbons boiling in the range of between about 132° and about 399° C. (270° to 750° F.) using the True Boiling Point distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant", "predominantly" or "predominate" means greater than 50%, suitably greater than 75% and preferably greater than 90%.

DETAILED DESCRIPTION

We have found a significant amount of hydrogen is contained in a hot flash liquid stream. The hydrogen in the hot flash drum liquid stream ends up in the off-gas from the product stripping column or the product fractionation column and is usually lost to fuel gas. A process and apparatus described strips the hot separator liquid in a hot flash stripper to decrease the solution loss of hydrogen in the hot flash liquid stream that is routed to the product stripping column. In process and apparatus embodiments, the hot flash stripper column concentrates hydrogen in the hot flash vapor stream from which hydrogen gas can be recovered more economically. Removal of hydrogen from the hot flash liquid to product fractionation reduces gas volume in the stripper off-gas which also enables more efficient light gas recovery.

We have found that the subject process and apparatus can improve hydrogen recovery by 15 wt %. Moreover, over 80 wt % less LPG can be lost in fractionation off-gases when the bulk of hydrogen is removed in the hot flash stripper.

In FIG. 1, the hydroprocessing unit 10 for hydroprocessing hydrocarbons comprises a hydroprocessing reactor section 12, a separation section 14, a fractionation section 16 and a hydrogen recovery section 100. A hydrocarbonaceous stream in hydrocarbon line 18 and a hydrogen-rich stream in hydrogen line 20 are fed to the hydroprocessing reactor section 12. Hydroprocessed effluent is separated in the fractionation section 16.

Hydroprocessing that occurs in the hydroprocessing reactor section 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing reactor section 12. Consequently, the term "hydroprocessing" will include the term "hydrocracking" herein. Hydrocracking also includes slurry hydrocracking in which resid feed is mixed with catalyst and hydrogen to make a slurry and cracked to lower boiling products.

Hydroprocessing that occurs in the hydroprocessing reactor section 12 may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced. The subject process and apparatus will be described with the hydroprocessing reactor section 12 comprising a hydrotreating reactor 30 and a hydrocracking reactor 40. It should be understood that a hydroprocessing reactor section 12 can comprise either or both.

In one aspect, the process and apparatus described herein are particularly useful for hydroprocessing a hydrocarbon feed stream comprising a hydrocarbonaceous feedstock. Illustrative hydrocarbonaceous feed stocks particularly for hydroprocessing units having a hydrocracking reactor include hydrocarbon streams having initial boiling points (IBP) above about 288° C. (550° F.), such as atmospheric gas oils, vacuum gas oil (VGO) having T5 and T95 between about 315° C. (600° F.) and about 650° C. (1200° F.), deasphalted oil, coker distillates, straight run distillates, pyrolysis-derived oils, high boiling synthetic oils, cycle oils, clarified slurry oils, deasphalted oil, shale oil, hydrocracked feeds, catalytic cracker distillates, atmospheric residue having an IBP at or above about 343° C. (650° F.) and vacuum residue having an IBP above about 510° C. (950° F.).

The hydrogen stream in the hydrogen line 20 may split off from a hydroprocessing hydrogen line 23. The hydrogen stream in line 20 may be a hydrotreating hydrogen stream. The hydrotreating hydrogen stream may join the hydrocarbonaceous stream in the hydrocarbon line 18 to provide a hydrocarbon feed stream in a hydrocarbon feed line 26. The hydrocarbon feed stream in the hydrocarbon feed line 26 may be heated by heat exchange with a hydrocracked stream in line 48 and in a fired heater. The heated hydrocarbon feed stream in line 28 may be fed to a hydrotreating reactor 30.

The hydrotreating reactor 30 may be a fixed bed reactor that comprises one or more vessels, single or multiple beds of catalyst in each vessel, and various combinations of hydrotreating catalyst in one or more vessels. It is contemplated that the hydrotreating reactor 30 be operated in a continuous liquid phase in which the volume of the liquid hydrocarbon feed is greater than the volume of the hydrogen gas. The hydrotreating reactor 30 may also be operated in a conventional continuous gas phase, a moving bed or a fluidized bed hydrotreating reactor.

The hydrotreating reactor 30 may provide conversion per pass of about 10 to about 40 vol %.

The hydrotreating reactor 30 may comprise a guard bed of specialized material for pressure drop mitigation followed by one or more beds of higher quality hydrotreating catalyst. The guard bed filters particulates and picks up contaminants in the hydrocarbon feed stream such as metals like nickel, vanadium, silicon and arsenic which deactivate the catalyst. The guard bed may comprise material similar to the hydrotreating catalyst. Supplemental hydrogen may be added at an interstage location between catalyst beds in the hydrotreating reactor 30.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 30. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.8 MPa (gauge) (400 psig) to about 17.5 MPa (gauge) (2500 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,011 $Nm^3/m^3$ oil (6,000 scf/bbl), preferably about 168 $Nm^3/m^3$ oil (1,000 scf/bbl) to about 1,250 $Nm^3/m^3$ oil (7,500 scf/bbl), with a hydrotreating catalyst or a combination of hydrotreating catalysts.

The hydrocarbon feed stream in the hydrocarbon feed line 28 may be hydroprocessed in a hydroprocessing reactor with the hydrogen stream over hydroprocessing catalyst to provide a hydroprocessed effluent stream. Specifically, the hydrocarbon feed stream in the hydrocarbon feed line 28 may be hydrotreated with the hydrotreating hydrogen stream from hydrotreating hydrogen line 20 over the hydrotreating catalyst in the hydrotreating reactor 30 to provide a hydrotreated hydrocarbon stream that exits the hydrotreating reactor 30 in a hydrotreated effluent line 32. The hydrotreated effluent stream may be forwarded to the separation section 14 or be taken as a hydrocracking feed stream. The hydrogen gas laden with ammonia and hydrogen sulfide may be removed from the hydrocracking feed stream in a separator, but the hydrocracking feed stream is typically fed directly to the hydrocracking reactor 40 without separation. The hydrocracking feed stream may be mixed with a hydrocracking hydrogen stream in a hydrocracking hydrogen line 21 taken from the hydroprocessing hydrogen line 23 and be fed through an inlet to the hydrocracking reactor 40 to be hydrocracked.

Hydrocracking is a process in which hydrocarbons crack in the presence of hydrogen to lower molecular weight hydrocarbons. The hydrocracking reactor 40 may be a fixed bed reactor that comprises one or more vessels, single or multiple catalyst beds 42 in each vessel, and various combinations of hydrotreating catalyst and/or hydrocracking catalyst in one or more vessels. It is contemplated that the hydrocracking reactor 40 be operated in a continuous liquid phase in which the volume of the liquid hydrocarbon feed is greater than the volume of the hydrogen gas. The hydrocracking reactor 40 may also be operated in a conventional continuous gas phase, a moving bed or a fluidized bed hydroprocessing reactor. The term "hydroprocessing" will include the term "hydrocracking" herein.

The hydrocracking reactor 40 comprises a plurality of hydrocracking catalyst beds 42. If the hydrocracking reactor section 12 does not include a hydrotreating reactor 30, the catalyst beds 42 in the hydrocracking reactor 40 may include a hydrotreating catalyst for the purpose of saturating, demetallizing, desulfurizing or denitrogenating the hydrocarbon feed stream before it is hydrocracked with the hydrocracking catalyst in subsequent vessels or catalyst beds 42 in the hydrocracking reactor 40.

The hydrotreated hydrocarbon feed stream is hydroprocessed over a hydroprocessing catalyst in a hydroprocessing reactor in the presence of a hydrocracking hydrogen stream from a hydrocracking hydrogen line 21 to provide a hydroprocessed effluent stream. Specifically, the hydrotreated hydrocarbon feed stream is hydrocracked over a hydrocracking catalyst in the hydrocracking reactor 40 in the presence of the hydrocracking hydrogen stream from a hydrocracking hydrogen line 21 to provide a hydrocracked effluent stream. A hydrogen manifold may deliver supplemental hydrogen streams to one, some or each of the catalyst beds 42. In an aspect, the supplemental hydrogen is added to each of the hydrocracking catalyst beds 42 at an interstage location between adjacent beds, so supplemental hydrogen is mixed with hydroprocessed effluent exiting from the upstream catalyst bed 42 before entering the downstream catalyst bed 42.

The hydrocracking reactor may provide a total conversion of at least about 20 vol % and typically greater than about 60 vol % of the hydrotreated hydrocarbon stream in the hydrotreated effluent line 32 to products boiling below the cut point of the heaviest desired product which is typically diesel. The hydrocracking reactor 40 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the diesel cut point.

The hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the hydrocracking reactor 40 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 hr⁻ and a hydrogen rate of about 421 Nm³/m³ (2,500 scf/bbl) to about 2,527 Nm³/m³ oil (15,000 scf/bbl). If mild hydrocracking is desired, conditions may include a temperature from about 35° C. (600° F.) to about 441° C. (825° F.), a pressure from about 5.5 MPa (gauge) (800 psig) to about 3.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 hr⁻¹ and preferably about 0.7 to about 1.5 hr⁻¹ and a hydrogen rate of about 421 Nm³/m³ oil (2,500 scf/bbl) to about 1,685 Nm³/m³ oil (10,000 scf/bbl).

The hydroprocessed effluent stream may exit the hydrocracking reactor 40 in the hydrocracked effluent line 48 and be separated in the separation section 14 in downstream communication with the hydroprocessing reactor comprising the hydrotreating reactor 30 and/or the hydrocracking reactor 40. The separation section 14 comprises one or more separators in downstream communication with the hydroprocessing reactor comprising the hydrotreating reactor 30 and/or the hydrocracking reactor 40. The hydrocracked effluent stream in the hydrocracked line 48 may in an aspect be heat exchanged with the hydrocarbon feed stream in the hydrocarbon feed line 26 and be delivered to a hot separator 50.

The hot separator 50 separates the hydroprocessed effluent stream to provide a hydrocarbonaceous, hot vapor stream in a hot overhead line 52 extending from a top of the hot separator 50 and a hydrocarbonaceous, hot liquid stream in a hot bottoms line 54 extending from a bottom of the hot separator 50. The hot separator 50 may be in downstream communication with the hydroprocessing reactor comprising the hydrotreating reactor 30 and/or the hydrocracking reactor 40. The hot separator 50 operates at about 77° C. (350° F.) to about 371° C. (700° F.) and preferably operates at about 232° C. (450° F.) to about 315° C. (600° F.). The hot separator 50 may be operated at a slightly lower pressure than the hydrocracking reactor 40 accounting for pressure drop through intervening equipment. The hot separator 50 may be operated at pressures between about 3.4 MPa (gauge) (493 psig) and about 20.4 MPa (gauge) (2960 psig). The hydrocarbonaceous, hot vapor stream taken in the hot overhead line 52 may have a temperature of the operating temperature of the hot separator 50.

The hot vapor stream in the hot overhead line 52 may be cooled with an air cooler 53 before entering a cold separator 56. As a consequence of the reactions taking place in the hydrocracking reactor 40 wherein nitrogen, chlorine and sulfur are reacted from the hydrocarbons in the feed, ammonia, hydrogen sulfide and hydrogen chloride are formed. At a characteristic sublimation temperature, ammonia and hydrogen sulfide will combine to form ammonium bisulfide, and ammonia and hydrogen chloride will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 52 transporting the hot vapor stream, a suitable amount of wash water may be introduced into the hot overhead line 52 upstream of the air cooler 53 by water line 51 at a point in the hot overhead line where the temperature is above the characteristic sublimation temperature of either compound.

The hot vapor stream may be separated in the cold separator 56 to provide a cold vapor stream comprising a hydrogen-rich gas stream in a cold overhead line 58 extending from a top of the cold separator 56 and a cold liquid stream in a cold bottoms line 60 extending from a bottom of the cold separator 56. The cold separator 56 serves to separate hydrogen rich gas from hydrocarbon liquid in the hydroprocessed stream for recycle to the reactor section 12 in the cold overhead line 58. The cold separator 56, therefore, is in downstream communication with the hot overhead line 52 of the hot separator 50 and the hydroprocessing reactor comprising the hydrotreating reactor 30 and/or the hydrocracking reactor 40. The cold separator 56 may be operated at about 100° F. (38° C.) to about 150° F. (66° C.), suitably about 115° F. (46° C.) to about 145° F. (63° C.), and just below the pressure of the hydroprocessing reactor comprising the hydrotreating reactor 30 and/or the hydrocracking reactor 40 and the hot separator 50 accounting for pressure drop through intervening equipment to keep hydrogen and light gases in the overhead and normally liquid hydrocarbons in the bottoms. The cold separator 56 may be operated at pressures between about 3 MPa (gauge) (435 psig) and about 20 MPa (gauge) (2,900 psig). The cold separator 56 may also have a boot for collecting an aqueous phase. The cold liquid stream in the cold bottoms line 60 may have a temperature of the operating temperature of the cold separator 56.

The cold vapor stream in the cold overhead line 58 is rich in hydrogen. Thus, hydrogen can be recovered from the cold vapor stream. The cold vapor stream in the cold overhead line 58 may be passed through a trayed or packed recycle scrubbing column 62 where it is scrubbed by means of a scrubbing extraction liquid such as an aqueous solution fed by line 64 to remove acid gases including hydrogen sulfide by extracting them into the aqueous solution. Preferred extraction liquids include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide. The resultant "sweetened" cold vapor stream is taken out from an overhead outlet of the recycle scrubber column 62 in a recycle scrubber overhead line 68, and a rich amine is taken out from the bottoms at a bottom outlet of the recycle scrubber column in a recycle scrubber bottoms line 66. The spent scrubbing liquid from the bottoms may be regenerated and recycled back to the recycle scrubbing column 62 in the solvent line 64. The scrubbed hydrogen-rich stream emerges from the scrubber via the recycle scrubber overhead line 68 and may be compressed in a recycle compressor 44. The scrubbed hydrogen-rich stream in the scrubber overhead line 68 may be supplemented with make-up hydrogen stream in the make-up line 22 upstream or downstream of the compressor 44. The compressed hydrogen stream supplies hydrogen to the hydrogen stream in the hydrogen line 23. The recycle scrubbing column 62 may be operated with a gas inlet temperature between about 38° C. (100° F.) and about 66° C. (150° F.) and an overhead pressure of about 3 MPa (gauge) (435 psig) to about 20 MPa (gauge) (2900 psig). The recycle scrubbing column 62 may be operated at a temperature of about 40° C. (104° F.) to about 125° C. (257° F.) and a pressure of about 1200 to about 1600 kPa. The temperature of the hot vapor stream to the recycle scrubbing column 62 may be between about 20° C. (68° F.) and about 80° C. (176° F.) and the temperature of the scrubbing extraction liquid stream in the solvent line 64 may be between about 20° C. (68° F.) and about 70° C. (158° F.).

The hydrocarbonaceous hot liquid stream in the hot bottoms line 54 comprises a substantial hydrogen concentration. The hot liquid stream may be let down in pressure and fed to a hot flash stripper 72 through a hot flash inlet 54i. The hot flash stripper 72 contains trays or packing 73. If trays are used, about 5 to about 10 trays are sufficient. The hot liquid stream in the hot bottoms line 54 may be fed near a top of the hot flash stripper through the hot flash inlet 54i which is located above the trays or packing 73. An inert gas stream from inert gas line 77 is fed though an inert gas inlet 77i located below the trays or packing 73 which facilitates contacting between the inert gas stream and the hot liquid stream. The inert gas stream may be high pressure steam at a pressure of about 3.4 MPa (500 psig) to about 4.8 MPa (700 psig), such as 4.1 MPa (600 psig), and at a rate of about 5.7 kg/m$^3$ (2 lbs/bbl) to about 14.2 kg/m$^3$ (5 lbs/barrel) of hot flash liquid in the hot flash bottoms line 76. The inert gas stream contacts the hot liquid stream in the hot flash stripper to strip hydrogen from the hot liquid stream to provide a hot flash vapor stream of light ends and hydrogen in a hot flash overhead line 74 extending from a top of the hot flash stripper and a hot flash liquid stream in a hot flash bottoms line 76 extending from a bottom of the hot flash stripper. As a result of the stripping in the hot flash stripper 72 hydrogen concentration is increased the hot flash vapor compared to what it would be without stripping. Moreover, as a result of the stripping in the hot flash stripper 72 hydrogen concentration is decreased the hot flash liquid compared to what it would be without stripping. Additionally, the hydrogen concentration in the hot flash vapor stream in the hot flash overhead line 74 is greater than in the hot liquid stream in the hot bottoms line 54, and the hot flash liquid stream has a concentration of hydrogen that is less than in the hot liquid stream in the hot bottoms line 54. The hot flash overhead line 74 is in downstream communication with the hot flash stripper 72. The hot flash stripper 72 may be in direct, downstream communication with the hot bottoms line 54 and in downstream communication with the hydroprocessing reactor comprising the hydrotreating reactor 30 and/or the hydrocracking reactor 40. In an aspect, light gases such as hydrogen sulfide may be stripped from the hot flash liquid stream in the hot flash bottoms line 76. Accordingly, a product stripping column 90 may be in direct, downstream communication with the hot flash stripper 72 and the hot flash bottoms line 76.

The hot flash stripper 72 may be operated at the same temperature as the hot separator 50 but at a lower pressure of between about 1.4 MPa (gauge) (200 psig) and about 6.9 MPa (gauge) (1000 psig), suitably no more than about 3.8 MPa (gauge) (550 psig). The hot flash liquid stream taken in the hot flash bottoms line 76 may have a temperature of the operating temperature of the hot flash stripper 72.

In an aspect, the cold liquid stream in the cold bottoms line 60 may be let down in pressure and flashed in a cold flash drum 78 to separate the cold liquid stream in the cold bottoms line 60. The cold flash drum 78 may be in direct, downstream communication with the cold bottoms line 60 of the cold separator 56 and in downstream communication with the hydroprocessing reactor comprising the hydrotreating reactor 30 and/or the hydrocracking reactor 40. The cold flash drum 78 may separate the cold liquid stream in the cold bottoms line 60 to provide a cold flash vapor stream in a cold flash overhead line 80 extending from a top of the cold flash drum 78 and a cold flash liquid stream in a cold flash bottoms line 82 extending from a bottom of the cold flash drum. In an aspect, light gases such as hydrogen sulfide may be stripped from the cold flash liquid stream in the cold flash bottoms line 82. Accordingly, a product stripping column 90 may be in downstream communication with the cold flash drum 78 and the cold flash bottoms line 82.

The cold flash drum 78 may be in downstream communication with the cold bottoms line 60 of the cold separator 56 and the hydroprocessing reactor comprising the hydrotreating reactor 30 and/or the hydrocracking reactor 40. The cold flash drum 78 may be operated at the same temperature as the cold separator 56 but typically at a lower pressure of between about 1.4 MPa (gauge) (200 psig) and about 6.9 MPa (gauge) (1000 psig) and preferably between about 2.4 MPa (gauge) (350 psig) and about 3.8 MPa (gauge) (550 psig). A flashed aqueous stream may be removed from a boot in the cold flash drum 78. The cold flash liquid stream in the cold flash bottoms line 82 may have the same temperature as the operating temperature of the cold flash drum 78. The cold flash vapor stream in the cold flash overhead line 80 contains substantial hydrogen that may be recovered.

In an embodiment, the hot flash vapor stream enriched in hydrogen concentration may be cooled in the cooler 75 to condense the inert stripping gas and fed to the cold flash drum 78 to be flashed with the cold liquid stream in the cold bottoms line 60. In an aspect, the cold bottoms line 60 may be joined by the hot flash overhead line 74 and receive the cooled hot flash vapor stream in which the cold bottoms line 60 delivers both streams, the cooled, hot flash vapor stream and the cold liquid stream, to the cold flash drum 78. In this embodiment, the cold flash drum 78 may be in downstream communication with the hot flash overhead line 74 of the hot flash stripper 72.

The cold flash vapor stream in the cold flash overhead line 80 is rich in hydrogen which may be recovered in a hydrogen recovery section 100. The cold flash vapor stream comprises a predominant proportion of the hydrogen in the hot flash vapor stream in the hot flash overhead line 74. Thus, hydrogen can be recovered from the hot flash vapor stream by recovering hydrogen from the cold flash vapor stream. The cold flash vapor stream in the cold flash overhead line 80 may be passed through the trayed or packed scrubbing column 34. The scrubbing column 34 may be in downstream communication with the hot flash overhead line 74 and the cold flash overhead line 80. The cold flash vapor stream in the cold flash overhead line 80 is fed to a lower portion of the scrubbing column 34. The cold flash vapor stream is scrubbed by means of a scrubbing extraction liquid stream such as an aqueous solution fed by solvent line 38 to remove acid gases including hydrogen sulfide and carbon dioxide by extracting them into the aqueous solution. Preferred extraction liquids include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide. The resultant "sweetened" scrubbed vapor stream is taken out from an overhead outlet of the scrubbing column 34 in a scrubber overhead line 39, and a rich amine is taken out from the bottoms at a bottom outlet of the scrubbing column 34 in a scrubber bottoms line 36. The spent scrubbing liquid from the bottoms may be regenerated and recycled back to the scrubbing column 34 in line 38. The scrubbed hydrogen-rich vapor stream emerges from the scrubber via the scrubber overhead line 39 and may be routed to a pressure swing adsorption (PSA) unit 160 to yield a high purity hydrogen rich stream 162 and a low purity waste stream 164. The high purity hydrogen stream 162 may combine with additional hydrogen rich makeup gas 166 and may be compressed in a make-up compressor 46. The low hydrogen purity stream 164 comprises the majority of the non-hydrogen compounds in the scrubbed hydrogen-rich vapor stream in the scrubber overhead line 39. The low hydrogen purity stream 164 may be routed to a low pressure burner in a nearby heater or compressed and sent to the fuel gas header (not shown). The compressed stream from the make-up compressor 46 may provide make-up hydrogen gas in line 22 to the hydroprocessing reactor section 12. The scrubbing column 34 may be operated at a temperature of about 40° C. (104° F.) to about 125° C. (257° F.) and a pressure of about 1200 to about 1700 kPa. The temperature of the cold flash overhead stream 80 to the scrubber 34 may be between about 20° C. (68° F.) and about 80° C. (176° F.) and the temperature of the scrubbing extraction liquid stream in the solvent line 38 may be between about 25° C. (77° F.) and about 75° C. (185° F.).

The fractionation section 16 may include the stripping column 90 and a fractionation column 110. The stripping column 90 may be in downstream communication with a separator 50, 72, 56, 78 or a bottoms line in the separation section 14 for stripping volatiles from a hydrocracked stream. For example, the stripping column 90 may be in downstream communication with the hot bottoms line 54, the hot flash bottoms line 76, the cold bottoms line 60 and/or the cold flash bottoms line 82. In an aspect, the stripping column 90 may be a vessel that contains a cold stripping column 92 and a hot stripping column 94 with a wall that isolates each of the stripping columns 92, 94 from the other. The cold stripping column 92 may be in downstream communication with the hydroprocessing reactor comprising the hydrotreating reactor 30 and/or the hydrocracking reactor 40, the cold bottoms line 60 and, in an aspect, the cold flash bottoms line 82 for stripping the cold liquid stream. The hot stripping column 94 may be in downstream communication with the hydroprocessing reactor comprising the hydrotreating reactor 30 and/or the hydrocracking reactor 40 and the hot bottoms line 54 and, in an aspect, the hot flash bottoms line 76 for stripping a hot liquid stream which is hotter than the cold liquid stream. The hot liquid stream may be hotter than the cold liquid stream, by at least 25° C. and preferably at least 50° C.

The cold flash liquid stream comprising the hydrocracked stream in the cold flash bottoms line 82 may be heated and fed to the cold stripping column 92 at an inlet which may be in a top half of the column. The cold flash liquid stream which comprises the hydrocracked stream may be stripped of gases in the cold stripping column 92 with a cold stripping media which is an inert gas such as steam from a cold stripping media line 96 to provide a cold stripper vapor stream of naphtha, hydrogen, hydrogen sulfide, steam and other gases in a cold stripper overhead line 98 and a liquid cold stripped stream in a cold stripper bottoms line 101. The cold stripper vapor stream in the cold stripper overhead line 98 may be condensed and separated in a receiver 102. A stripper net overhead line 104 from the receiver 102 carries a net stripper off gas of LPG, light hydrocarbons, hydrogen sulfide and hydrogen. Unstabilized liquid naphtha from the bottoms of the receiver 102 may be split between a reflux portion refluxed to the top of the cold stripping column 92 and a liquid stripper overhead stream which may be transported in a condensed stripper overhead line 106 to further recovery or processing. A sour water stream may be collected from a boot of the overhead receiver 102.

The cold stripping column 92 may be operated with a bottoms temperature between about 150° C. (300° F.) and about 288° C. (550° F.), preferably no more than about 260° C. (500° F.), and an overhead pressure of about 0.7 MPa (gauge) (100 psig), preferably no less than about 0.34 MPa (gauge) (50 psig), to no more than about 2.0 MPa (gauge) (290 psig). The temperature in the overhead receiver 102 ranges from about 38° C. (100° F.) to about 66° C. (150° F.) and the pressure is essentially the same as in the overhead of the cold stripping column 92.

The cold stripped stream in the cold stripper bottoms line 101 may comprise predominantly naphtha and kerosene boiling materials. The cold stripped stream in line 101 may be heated and fed to the product fractionation column 110. The product fractionation column 110 may be in downstream communication with the hydroprocessing reactor comprising the hydrotreating reactor 30 and/or the hydrocracking reactor 40, the cold stripper bottoms line 101 of the cold stripping column 92 and the stripping column 90. In an aspect, the product fractionation column 110 may comprise more than one fractionation column. The product fractionation column 110 may be in downstream communication with one, some or all of the hot separator 50, the cold separator 56, the hot flash stripper 72 [HRK1] and the cold flash drum 78.

The hot flash liquid stream comprising a hydroprocessed stream in the hot flash bottoms line 76 may be fed to the hot stripping column 94 near a top thereof. The hot flash liquid stream may be stripped in the hot stripping column 94 of gases with a hot stripping media which is an inert gas such as steam from a line 108 to provide a hot stripper overhead stream of naphtha, hydrogen, hydrogen sulfide, steam and other gases in a hot stripper overhead line 112 and a liquid hot stripped stream in a hot stripper bottoms line 114. The hot stripper overhead line 112 may be condensed and a portion refluxed to the hot stripping column 104. However, in an embodiment, the hot stripper overhead stream in the hot stripper overhead line 112 from the overhead of the hot stripping column 94 may be fed into the cold stripping column 92 directly in an aspect without condensing or refluxing. The inlet for the cold flash bottoms line 82 carrying the cold flash liquid stream may be at a higher elevation than the inlet for the hot stripper overhead line 112. The hot stripping column 94 may be operated with a bottoms temperature between about 160° C. (320° F.) and about 360° C. (680° F.) and an overhead pressure of about 0.7 MPa (gauge) (100 psig), preferably no less than about 0.34 MPa (gauge) (50 psig), to no more than about 2.0 MPa (gauge) (290 psig).

At least a portion of the hot stripped stream comprising a hydroprocessed effluent stream in the hot stripped bottoms line 114 may be heated and fed to the product fractionation column 110. The product fractionation column 110 may be in downstream communication with the hot stripped bottoms line 114 of the hot stripping column 94. The hot stripped stream in line 114 may be at a hotter temperature than the cold stripped stream in the cold stripped bottoms line 101.

The product fractionation column 110 may be in downstream communication with the cold stripping column 92 and the hot stripping column 94 and may comprise more than one fractionation column for separating stripped hydroprocessed streams into product streams. The product fractionation column 110 may also be in downstream communication with the hot separator 50, the cold separator 56, the hot flash stripper 72, and the cold flash drum 78. The product fractionation column 110 may fractionate hydrocracked streams, the cold stripped stream, and the hot stripped stream by means of an inert stripping gas stream fed from stripping line 134. The product streams from the product fractionation column 110 may include a net fractionated overhead stream comprising naphtha in a net overhead line 126, an optional heavy naphtha stream in line 128 from a side cut outlet, a kerosene stream carried in line 130 from a side cut outlet and a diesel stream in diesel line 132 from a side outlet.

An unconverted oil (UCO) stream boiling above the diesel cut point may be taken in a fractionator bottoms line 140 from a bottom of the product fractionation column 110. A portion or all of the UCO stream in the fractionator bottoms line 140 may be purged from the process, recycled to the hydrocracking reactor 40 or forwarded to a second stage hydrocracking reactor (not shown).

Product streams may also be stripped to remove light materials to meet product purity requirements. A fractionated overhead stream in an overhead line 148 may be condensed and separated in a receiver 150 with a portion of the condensed liquid being refluxed back to the product fractionation column 110. The net fractionated overhead stream in line 126 may be further processed or recovered as naphtha product. The product fractionation column 110 may be operated with a bottoms temperature between about 260° C. (500° F.) and about 385° C. (725° F.), preferably at no more than about 380° C. (715° F.), and at an overhead pressure between about 7 kPa (gauge) (1 psig) and about 69 kPa (gauge) (10 psig). A portion of the UCO stream in the fractionator bottoms line 140 may be reboiled and returned to the product fractionation column 110 instead of adding an inert stripping media stream such as steam in line 134 to heat to the product fractionation column 110.

Figure 2:
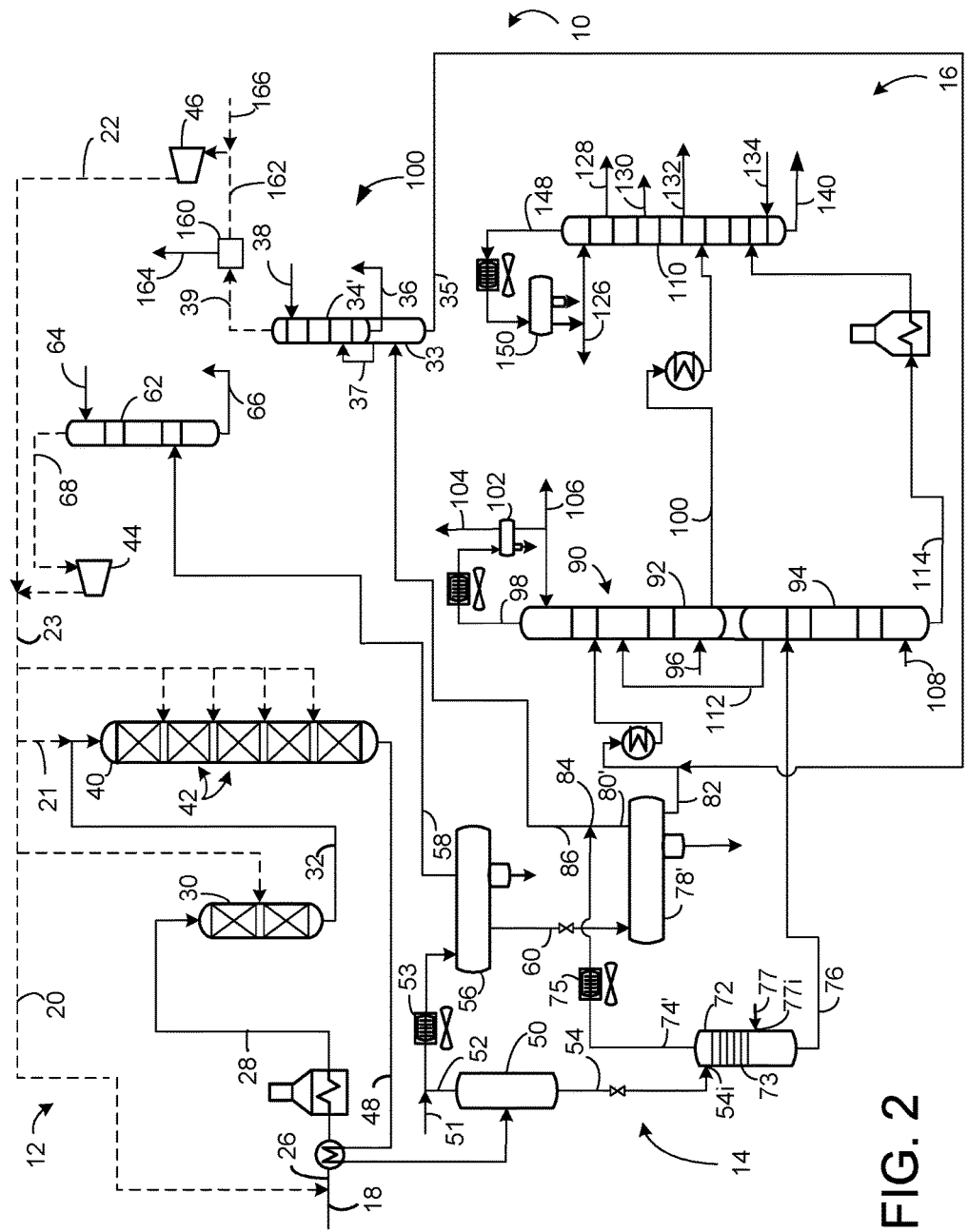
FIG. 2 is an alternative process flow diagram to FIG. 1.

FIG. 2 shows an alternate embodiment of the process and apparatus of FIG. 1 in which the hot flash vapor stream in the hot flash overhead line 74' bypasses the cold flash drum 78'. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the following exceptions.

In an aspect, the hot flash overhead stream in the hot flash overhead line 74' may be cooled with an air cooler 75 and join the cold flash overhead line 80' to mix the hot flash vapor stream with the cold flash vapor stream. We have discovered that feeding the hot flash vapor stream to the cold flash drum 78' permits some hydrogen in the hot flash vapor stream to enter into solution with the cold liquid and exit the cold flash drum 78' in the cold flash bottoms line 82. Instead, the cold flash drum 78' and the hot flash overhead line 74' are isolated from each other meaning the hot flash overhead line 74' never connects to the cold flash drum 78' and the hot flash vapor stream never enters the cold flash drum 78'. The hot flash vapor stream bypasses the cold flash drum 78', to enable the recovery of hydrogen from the hot flash vapor stream in the hot flash bottoms line 74'. Hydrogen sulfide may be scrubbed in a scrubbing column 34' from the hot flash vapor stream in the hot flash overhead line 74' to provide a scrubbed hydrogen-rich stream.

In an aspect, the hot flash overhead stream in the hot flash overhead line 74' may be cooled in an air cooler 75 and have condensed liquid separated from the hot flash vapor stream in a scrubber separator 33 prior to scrubbing. Preferably, the hot flash overhead line 74' may join with the cold flash overhead line 80' at a junction 84 located outside of the cold flash drum 78'. The junction 84 is preferably located downstream of the cold flash drum 78' and may be in downstream communication with the cold flash drum 78', but the junction 84 is not in upstream communication with the cold flash drum. The junction 84 mixes the hot flash vapor stream in the hot flash overhead line 74' with the cold flash vapor stream in the cold flash overhead line 80' to provide a mixed stream in a mixed line 86. The cold flash drum 78' is, therefore, out of downstream communication with the hot flash overhead line 74' and the hot flash stripper 72.

The mixed stream in the mixed line 86 is rich in hydrogen. The mixed stream comprises a predominant proportion of the hydrogen in the hot flash vapor stream in the hot flash overhead line 74'. Thus, hydrogen can be recovered from the mixed stream. The mixed stream in the mixed line 86 may be passed through the trayed or packed recycle scrubbing column 34'. The scrubbing column 34' may be in downstream communication with the hot flash overhead line 74' and the cold flash overhead line 80' and said mixed line 86. The mixed stream is first fed to the scrubber separator 33 which may be in a lower portion of the scrubbing column 34' where any liquid formed by the cooling effect of the air cooler 75 is separated in a scrubber separator bottoms line 35 which may be fed to the cold flash liquid stream in cold flash bottoms line 82. The scrubber vapor stream exiting in the scrubber separator overhead line 37 is routed to the scrubbing column 34' by which it is scrubbed by means of a scrubbing extraction liquid such as an aqueous solution fed by line 38 to remove acid gases including hydrogen sulfide and carbon dioxide by extracting them into the aqueous solution. The lean amine contacts the cold vapor stream and absorbs acid gas contaminants such as hydrogen sulfide. The resultant "sweetened" scrubbed vapor stream is taken out from an overhead outlet of the scrubber column 34' in a scrubber overhead line 39, and a rich amine is taken out from the bottoms at a bottom outlet of the recycle scrubber column in a scrubber bottoms line 36. The spent scrubbing liquid from the bottoms may be regenerated and recycled back to the scrubbing column 34 in line 38. The scrubbed hydrogen-rich vapor stream emerges from the scrubber column 34' via the scrubber overhead line 39 and may be routed to a pressure swing adsorption (PSA) unit 160 to yield a high purity hydrogen rich stream 162 and a low purity waste stream 164. The scrubbing column 34' may be operated at a temperature of about 40° C. (104° F.) to about 125° C. (257° F.) and a pressure of about 1200 to about 1600 kPa. The temperature of the mixed stream in the mixed line 86 to the scrubber separator 33 may be between about 20° C. (68° F.) and about 80° C. (176° F.) and the temperature of the scrubbing extraction liquid stream in the solvent line 38 may be between about 20° C. (68° F.) and about 70° C. (158° F.).

The rest of the process and apparatus 10 are as described for FIG. 1.

Example

We ran a simulation to determine the reduction in hydrogen lost in solution from using a hot flash stripper to strip hydrogen out of the hot liquid stream. The hot flash stripper was operated at a temperature of 292° C. (557° F.) and a pressure of 3,000 kPa (436 psia). The simulation was of a hydrocracking unit processing 9,698 $m^3$ (61,000 barrels) per day. By stripping the hot liquid stream with 5,500 kg/h (12125 lb/h) of steam at a pressure of 4.1 MPa (600 psig), of the 999 kg/h hydrogen fed to the hot flash stripper, 146 kg/h more hydrogen was moved from the hot flash liquid stream to the hot flash vapor stream which could be recovered in a hydrogen recovery unit, resulting in a 15 wt % greater hydrogen recovery. Only 0.9 wt % hydrogen in the hot liquid stream was lost in the hot flash liquid stream.

Specific Embodiments

While the following is described in conjunction with specific embodiments, it will be understood that this description is intended to illustrate and not limit the scope of the preceding description and the appended claims.

A first embodiment of the invention is a process comprising hydroprocessing a hydrocarbon feed stream in a hydroprocessing reactor with a hydrogen stream over hydroprocessing catalyst to provide hydroprocessed effluent stream; separating the hydroprocessed effluent stream in a hot separator to provide a hot vapor stream and a hot liquid stream; and stripping the hot liquid stream in a hot flash stripper with an inert gas stream to provide a hot flash vapor stream with increased hydrogen concentration and a hot flash liquid stream. An embodiment of the invention is one, any or all of prior embodiments in this paragraph up through the first embodiment in this paragraph further comprising recovering hydrogen from the hot flash vapor stream. An embodiment of the invention is one, any or all of prior embodiments in this paragraph up through the first embodiment in this paragraph further comprising stripping the hot flash liquid stream with an inert gas stream to remove additional light gases. An embodiment of the invention is one, any or all of prior embodiments in this paragraph up through the first embodiment in this paragraph further comprising separating the hot vapor stream in a cold separator to provide a cold vapor stream and a cold liquid stream and flashing the cold liquid stream to provide a cold flash vapor stream and a cold flash liquid stream. An embodiment of the invention is one, any or all of prior embodiments in this paragraph up through the first embodiment in this paragraph further comprising cooling the hot flash vapor stream with a cooler before flashing the cold liquid stream. An embodiment of the invention is one, any or all of prior embodiments in this paragraph up through the first embodiment in this paragraph further comprising flashing the hot flash vapor stream with the cold flash liquid stream. An embodiment of the invention is one, any or all of prior embodiments in this paragraph up through the first embodiment in this paragraph further comprising mixing the hot flash vapor stream with a cold flash vapor stream to provide a mixed stream and recovering hydrogen from the mixed stream. An embodiment of the invention is one, any or all of prior embodiments in this paragraph up through the first embodiment in this paragraph further comprising stripping the hot flash liquid stream and the cold flash liquid stream to provide a stripped stream and fractionating the stripped stream in a product fractionation column to provide product streams. An embodiment of the invention is one, any or all of prior embodiments in this paragraph up through the first embodiment in this paragraph further comprising feeding the hot liquid stream near a top of the hot flash stripper above trays or packing and feed the inert gas stream below the trays or packing. An embodiment of the invention is one, any or all of prior embodiments in this paragraph up through the first embodiment in this paragraph further comprising cooling the hot flash vapor stream to condense lighter components therein such as water. An embodiment of the invention is one, any or all of prior embodiments in this paragraph up through the first embodiment in this paragraph further comprising reducing pressure of the hot liquid stream prior to stripping. An embodiment of the invention is one, any or all of prior embodiments in this paragraph up through the first embodiment in this paragraph further comprising scrubbing the hot flash vapor stream or a portion thereof with a solution for absorbing hydrogen sulfide to provide a hydrogen-rich stream, purifying the hydrogen-rich stream and compressing the purified hydrogen stream and recycling a compressed, hydrogen-rich stream to the hydroprocessing step as the hydrogen stream.

A second embodiment of the invention is an apparatus comprising a hydroprocessing reactor; a hot separator in communication with the hydroprocessing reactor; a hot flash stripper in communication with a hot bottoms line of the hot separator, a hot flash overhead line in communication with the hot flash stripper and a hot flash bottoms line in communication with the hot flash stripper; and a stripper column in communication with the hot flash bottoms line. An embodiment of the invention is one, any or all of prior embodiments in this paragraph up through the second embodiment in this paragraph further comprising a cold separator in communication with a hot overhead line of the hot separator; a cold flash drum in communication with a cold bottoms line of the cold separator; and the stripper column in communication with the a cold flash bottoms line of the cold flash drum. An embodiment of the invention is one, any or all of prior embodiments in this paragraph up through the second embodiment in this paragraph further comprising scrubber column in downstream communication with the hot flash overhead line. An embodiment of the invention is one, any or all of prior embodiments in this paragraph up through the second embodiment in this paragraph further comprising a scrubber column in downstream communication with the hot flash overhead line and the cold flash overhead line.

A third embodiment of the invention is a process comprising hydroprocessing a hydrocarbon feed stream in a hydroprocessing reactor with a hydrogen stream over hydroprocessing catalyst to provide hydroprocessed effluent stream; separating the hydroprocessed effluent stream in a hot separator to provide a hot vapor stream and a hot liquid stream; stripping the hot liquid stream in a hot flash stripper with an inert gas stream to provide a hot flash vapor stream with increased hydrogen concentration and a hot flash liquid stream; stripping the hot flash liquid stream with an inert gas stream to remove additional volatiles recovering hydrogen from the hot flash vapor stream. An embodiment of the invention is one, any or all of prior embodiments in this paragraph up through the third embodiment in this paragraph further comprising cooling the hot vapor stream with a cooler; separating the cooled, hot vapor stream in a cold separator to provide a cold vapor stream and a cold liquid stream; and separating the cold liquid stream in a cold flash drum to provide a cold flash vapor stream and a cold flash liquid stream and stripping the cold flash liquid stream with an inert gas to remove additional volatiles. An embodiment of the invention is one, any or all of prior embodiments in this paragraph up through the third embodiment in this paragraph further comprising recovering hydrogen from the hot flash vapor stream. An embodiment of the invention is one, any or all of prior embodiments in this paragraph up through the third embodiment in this paragraph further comprising feeding the hot liquid stream near a top of the hot flash stripper above trays or packing and feed the inert gas stream below the trays or packing.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydroprocessing process comprising:
   hydroprocessing a hydrocarbon feed stream in a hydroprocessing reactor with a hydrogen stream over hydroprocessing catalyst to provide hydroprocessed effluent stream;
   separating said hydroprocessed effluent stream in a hot separator to provide a hot vapor stream and a hot liquid stream having a concentration of hydrogen;
   stripping the hot liquid stream in a hot flash stripper with an inert gas stream to strip hydrogen from the hot liquid stream to provide a hot flash vapor stream of hydrogen and a hot flash liquid stream;
   recovering hydrogen from said hot flash vapor stream.

2. The hydroprocessing process of claim 1 further comprising stripping said hot flash liquid stream with an inert gas stream to remove additional light gases.

3. The hydroprocessing process of claim 1 further comprising separating said hot vapor stream in a cold separator to provide a cold vapor stream and a cold liquid stream and flashing said cold liquid stream to provide a cold flash vapor stream and a cold flash liquid stream.

4. The hydroprocessing process of claim 3 further comprising cooling said hot flash vapor stream with a cooler before flashing said cold liquid stream.

5. The hydroprocessing process of claim 3 further comprising flashing said hot flash vapor stream with said cold flash liquid stream.

6. The hydroprocessing process of claim 3 further comprising mixing said hot flash vapor stream with a cold flash vapor stream to provide a mixed stream and recovering hydrogen from said mixed stream.

7. The hydroprocessing process of claim 1 further comprising stripping said hot flash liquid stream and said cold flash liquid stream to provide a stripped stream and fractionating the stripped stream in a product fractionation column to provide product streams.

8. The hydroprocessing process of claim 1 further comprising feeding said hot liquid stream near a top of the hot flash stripper above trays or packing and feed said inert gas stream below said trays or packing.

9. The hydroprocessing process of claim 1 further comprising cooling said hot flash vapor stream to condense lighter components therein such as water.

10. The hydroprocessing process of claim 1 further comprising reducing pressure of said hot liquid stream prior to stripping.

11. The hydroprocessing process of claim 1 further comprising scrubbing said hot flash vapor stream or a portion thereof with a solution for absorbing hydrogen sulfide to provide a hydrogen-rich stream, purifying said hydrogen-rich stream and compressing said purified hydrogen stream and recycling a compressed, hydrogen-rich stream to said hydroprocessing step as said hydrogen stream.

12. A hydroprocessing process comprising:
hydroprocessing a hydrocarbon feed stream in a hydroprocessing reactor with a hydrogen stream over hydroprocessing catalyst to provide hydroprocessed effluent stream;
separating said hydroprocessed effluent stream in a hot separator to provide a hot vapor stream and a hot liquid stream having a concentration of hydrogen;
stripping the hot liquid stream in a hot flash stripper with an inert gas stream to strip hydrogen from the hot liquid stream to provide a hot flash vapor stream of hydrogen and a hot flash liquid stream;
stripping said hot flash liquid stream with an inert gas stream to remove additional volatiles; and
recovering hydrogen from said hot flash vapor stream.

13. The hydroprocessing process of claim 12 further comprising cooling said hot vapor stream with a cooler; separating the cooled, hot vapor stream in a cold separator to provide a cold vapor stream and a cold liquid stream; and separating said cold liquid stream in a cold flash drum to provide a cold flash vapor stream and a cold flash liquid stream and stripping said cold flash liquid stream with an inert gas to remove additional volatiles.

14. The hydroprocessing process of claim 12 further comprising feeding said hot liquid stream near a top of the hot flash stripper above trays or packing and feed said inert gas stream below said trays or packing.

\* \* \* \* \*